United States Patent [19]
Lemelson

[11] 3,805,393
[45] Apr. 23, 1974

[54] AUTOMATIC INSPECTION MACHINE

[76] Inventor: Jerome H. Lemelson, 85 Rector St., Metuchen, N.J. 08840

[22] Filed: Jan. 24, 1972

[21] Appl. No.: 220,303

Related U.S. Application Data

[63] Continuation-in-part of Ser. No. 864,510, Oct. 7, 1969, Pat. No. 3,636,635, which is a continuation-in-part of Ser. No. 518,616, Jan. 4, 1966, Pat. No. 3,476,481, which is a continuation-in-part of Ser. No. 250,942, Jan. 11, 1963, Pat. No. 3,226,833, which is a continuation-in-part of Ser. No. 477,467, Dec. 24, 1954, abandoned.

[52] U.S. Cl.............................. 33/174 L, 33/143 L
[51] Int. Cl........................... G01b 7/28, G01b 5/00
[58] Field of Search .......... 33/147 N, 143 L, 172 E, 33/174 PC, 178 E

[56] References Cited
UNITED STATES PATENTS

2,814,120   11/1957   Fogiel ............................. 33/147 N
2,752,687   7/1956    Graham ........................... 33/147 N
2,353,726   7/1944    Guttmann ........................ 33/23 C

*Primary Examiner*—Harry N. Haroian

[57] ABSTRACT

An apparatus and method are provided for automatically measuring dimensions across a work piece by sensing and indicating the distance between at least two surfaces or probes associated with the measuring machine. In one form, the measuring head is composed of a set of jaws, each of which contains means for locating a particular surface of a work piece and a jaw member which is moveable relative to the first means to close against an opposite surface of the work piece and, upon contacting or otherwise sensing said opposite surface, to indicate distance therebetween which is an indication of the particular dimension being measured.

11 Claims, 14 Drawing Figures

AUTOMATIC INSPECTION MACHINE

RELATED APPLICATIONS

This is a continuation-in-part of application Ser. No. 864,510 filed Oct. 7, 1969 for Automatic Measurement Apparatus, now U.S. Pat. No. 3,636,635 which was a continuation-in-part of application Ser. No. 518,616 filed Jan. 4, 1966, now U.S. Pat. No. 3,476,481 which was a continuation-in-part of application Ser. No. 250,942 filed Jan. 11, 1963, now U.S. Pat. No. 3,226,833 which was a continuation-in-part of application Ser. No. 477,467 filed Dec. 24, 1954, now abandoned.

SUMMARY OF THE INVENTION

This invention relates to an apparatus and method for automatically measuring dimensions of a work piece by disposing at least a portion of the work piece between sensing jaws of a measuring apparatus and thereafter closing at least one of the jaw members against and into contact with one of the surfaces which is to be measured. Upon sensing the unknown surface, the jaw or a limit switch located thereon generates a signal which may be indicative of the distance between the jaws and therefore the dimension across the surface of the work piece being measured.

Accordingly it is a primary object of this invention to provide a new and improved apparatus and method for measuring dimensions across a work piece member such as the dimensions between opposite surfaces of the work piece, diameters, etc.

Another object is to provide an automatic measuring device containing a power operated jaw member which simulates the action of a micrometer yet which is automatically controlled in its operation to measure diameters and other dimensions across a work piece and is operable to generate electrical signals which are indicative of diameters or dimensions measured thereby so as to eliminate the need for performing measurements by human manipulation and observation.

Another object is to provide an apparatus and method for rapidly and easily automatically measuring diameters of tubing, rod and portions of units of work which have been machined in a lathe.

Another object is to provide an apparatus and method for measuring diameters and dimensions between surfaces automatically and by moving a measuring head in a single stroke rather than a plurality of movements thereof.

Another object is to provide an automatic inspection apparatus which may easily be adapted to provide information for computerized quality control and machine automatic control.

Another object is to provide an automatic inspection apparatus employing a precision optically readable coded scale and a photo-optical reading means for determining the movement of an inspection probe and/or movement of a work piece in a precise manner and in a form which may be readily utilized by a computer.

With the above and such other objects in view as may hereafter more fully appear, the invention consists of the novel constructions, combinations and arrangements of parts as will be more fully described and illustrated in the accompany drawings, but it is to be understood that changes, variations and modifications may be resorted to which fall within the scope of the invention as claimed.

IN THE DRAWINGS:

FIG. 9' is a schematic diagram of a circuit arrangement for recording codes representative of dimensions measured;

Figure 1:
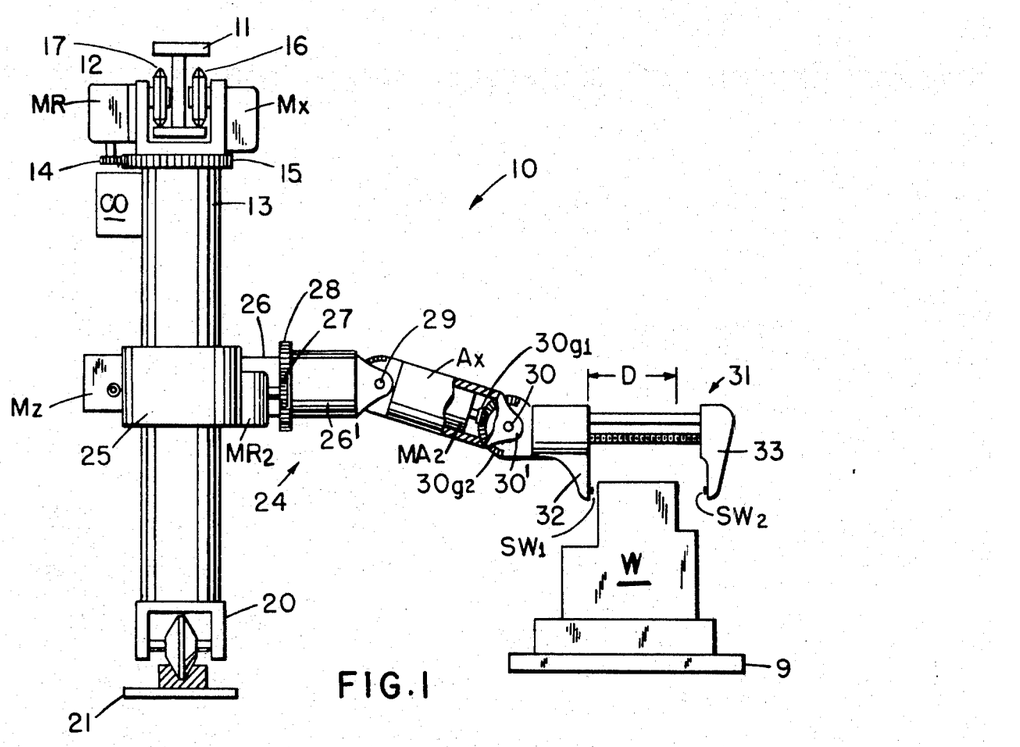
FIG. 1 is an end elevational view of an automatic dimensional measuring apparatus having movable jaws for engaging adjacent or opposite surfaces of a workpiece.

In FIG. 1 an automatic measuring apparatus 10 is movable along an overhead track 11 and/or a floor mounted track 21 for prepositioning its measuring head assembly 31 relative to work-in-process generally designated W. The work W may be prepositioned on a base 9 which may comprise a work table or a conveyor adapted also to bring the work into alignment with the measuring apparatus 10.

The measuring apparatus 10 is shown having a programming control CO device mounted in a housing secured to the apparatus which preferably includes easily presettable or programmable control elements operatively connected for controlling the various servo motors associated with the measuring apparatus to preposition the measuring head, for example, directly over the portion of the workpiece or assembly W to measure a dimension such as D. The programming controller CO may consist of a plurality of manually presettable dials for presetting precision resistors, counters or switching circuits for controlling the movement of the components to be described whereby the measuring head 31 is moved through a predetermined path relative to the workpiece. In addition to prepositioning the measuring head 31, the controller cO preferably further effects movement of one or more contact or proximity probes associated with 31 which are automatically stopped and retracted upon sensing a surface comprising one of the plurality of surfaces across which measurement is desired. Initiation of the operation of controller CO may be manually effected once the assembly 10 is in a predetermined position relative to the workpiece W or by automatic means as will be hereinafter described.

The automatic measuring apparatus comprises, in FIG. 1, an overhead carriage 12 supporting a vertical column 13 which is shown rotationally mounted and depending downward from 12. A first motor Mx is secured to the carriage 12 and is preferably a gear-motor having a drive wheel 16 having peripheral teeth and secured to the shaft of Mx and urged thereby to engage a shaped portion of the overhead track for longitudinally driving assembly 10 therealong. In a similar manner, a drive motor such as Mx may be secured to the carriage or retainer 20 at the lower end of 13 for urging said assembly along the floor mounted track 21.

A fixture 24 which includes the measuring head assembly 31 depends outward from a base or carriage 25 adapted for moving vertically along the column 13 to position the measuring head assembly in the vertical direction. A large spur gear 15 is shown secured to the upper end of 13 which is engaged by a smaller spur gear 14 secured to the shaft of a motor MR which is secured to the upper carriage 12 and is controlled in its operation by signals from programming controller CO to rotate column 13 for prepositioning measuring head 31 in a plurality of cylindrical paths. Wheels 17 rotationally supported on the carriage 12 engage the lower portion or flange of the overhead track and further wheels supported by the lower carriage 20 also engage the lower track 21 for movement of the assembly longitudinally along the two tracks.

Projecting outward from carriage 25 is an assembly including a first cylindrical arm member 26 mounting a first gear-motor MR-2 the shaft of which mounts a gear 27 which engages a larger gear 28 secured to a second arm 26' which is thereby rotatable relative to member 26 by means of said motor. The other end of arm 26' contains a rotational joint 29 which pivotally supports a third arm Ax which internally mounts a third gear motor MA1 not shown for pivoting Ax relative to arm 26'. The other end of AX contains a pivoting joint 30 and a fourth gear motor MA2 which is operative to rotate a portion of the joint 30 including the measuring head assembly 31 relative to Ax. As stated, all of the hereinabove described drive motors contain respective start, stop, reverse and speed controls which are operatively coupled to and controllable by the controlling programmer CO by means illustrated in my said copending application. The measurement head assembly 31 is thus prepositioned relative to the workpiece W by the automatic and predetermined control of said servo motors and is preferably operative thereafter to engage one or more surfaces of said workpiece aligned with the assembly 10 and to effect automatic measurement across predetermined portions of the workpiece.

Notations SW1 and SW2 define indicating or sensing means positioned on or within the jaw members or probe arms 32 and 33 of the measuring head assembly 31 for sensing surfaces of work W and indicating by generating electrical signals when a particular surface is in contact with or immediately adjacent said sensing means. The sensors SW may comprise electro-mechanical limit switches adapted with actuator means operative upon engagement of a workpiece surface, surface proximity detectors such as capacitance discharge or electro-magnetic relays operative when proximate to a surface; photoelectric or other radiation sensitive means, or other known type of surface detector or transducer.

Similar surface detection means may be utilized in the apparatus hereinafter described to indicate the proximity of one or more surfaces for effecting automatic measurement functions.

Rotation of the assembly 31 relative to arm Ax may be effected by gear means as illustrated in my application Ser. No. 477,467. As shown in FIG. 1, reversible gear-motor MA2, mounted within arm Ax, has a small bevel gear 30C-1 secured to its output shaft which gear engages teeth of a larger gear 30C-2 which is fixedly assembled with assembly 31 and is supported in bearing between portions of a yoke formation 30' projecting from the end of arm Ax. Thus, as motor MA-2 operates, assembly 31 will pivot about the axis of joint 30, the direction and degree of which movement will depend on the rotation and degree of operation MA-2.

Figure 2:
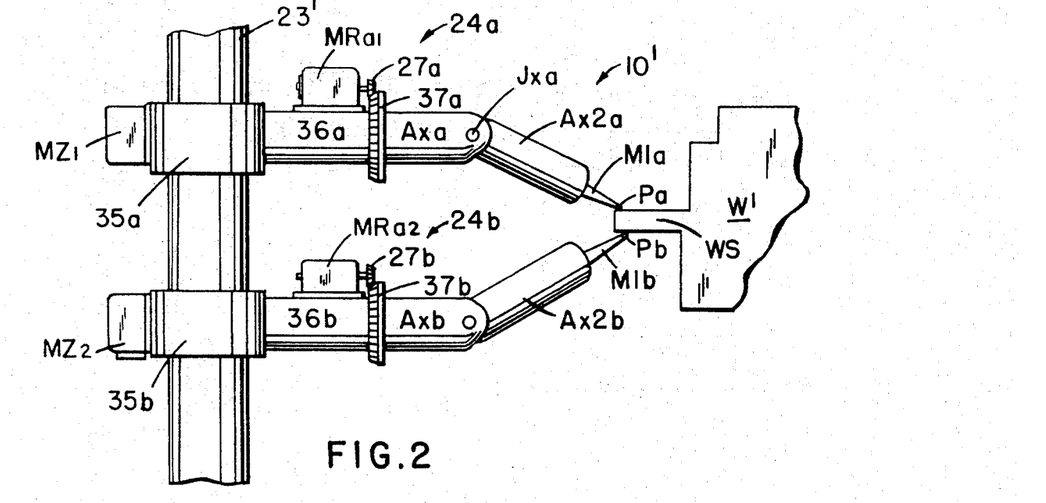
FIG. 2 is an end elevation showing an automatic measuring apparatus having a plurality of movable and programmably adjustable surface sensing probes.

FIG. 2 illustrates a portion of an automatic measuring apparatus which may also have components provided in the apparatus of FIG. 1 or may be otherwise modified as hereinafter described. The assembly 10' includes in addition to a vertical column 23' which, like the column 13 of FIG. 1, may be stationary, longitudinally movable along a track, rotatable and/or pivotable and serves as means for supporting and guiding a plurality of measuring probe assemblies referred to by the notations 24a and 24b. The measuring probe assembly 24a is movable vertically up and down column 23' of a carriage or base 25a which supports a motor MZ1 which is operative for vertically driving 35a up and down 23'. Similarly the assembly 24b is supported on a base 35b adapted for up and down movement along column 23' and drivable by a motor MZ2 mounted thereon. The assembly 24a will be described and, for the purpose of simplifying the description, assembly 24b is shown as having similar components to those of 24a but referred to by similar numerical notations having subscripts "b" rather than "a". Mounted on the lateral cylindrical column 36a is shown a gear motor MRal having a small gear 27a pinned to the end of its shaft which engages a larger bevel gear 37a secured to a second arm Axa which is rotationally supported relative to column 36a and rotatable with the operation of motor MRal. The other end of Axa is provided with a joint Jxa which pivotally supports a further arm A2xa for rotation about the axis of the joint. Secured to the end of arm A2xa is a measuring probe Mia the end of which mounts a proximity sensing element Pa which is adapted to sense the presence of a surface of the workpiece when immediately adjacent thereto or in contact therewith. The sensing element Pa may comprise any known proximity sensing transducer such as an electromagnetic proximity switch, the capacitance sensitive relay, photoelectric or other detector. In its simplest form, the sensing means Pa may comprise the actuating arm of a pivoting switch or limit switch.

As hereinabove described, a single programming controller CO mounted conveniently on or adjacent the column 23' and having control circuits extending therefrom which are operatively connected to the various described drive servos of both assemblies 24a and 24b may be utilized for precisely prepositioning the sensing means P of the probes relative to various surfaces of the workpiece W' which may be prepositioned relative to assembly 10' on a movable conveying means which may be also controlled by CO or on a stationary prepositioning fixture.

Components of the assembly 24b which are the same as corresponding components of the assembly 24a, have similar numeral notations with superscripts changed from "a" to "b'".

While the two probe tips Pa and Pb of FIG. 2 are shown positioned for measuring the thickness of a shelf or horizontal projection Ws of the workpiece W', it is readily seen that by moving assemblies 24a and 24b along column 23', positioning by rotating, pivoting or otherwise moving 23', controlling motors MRa and the motors pivotally positioning arms Ax2, the probes MIa and MIb may be brought into contact with or adjacent many surfaces of a workpiece or assembly to effect measurement or locate said surfaces.

Figures 3, 4, 5, 6:
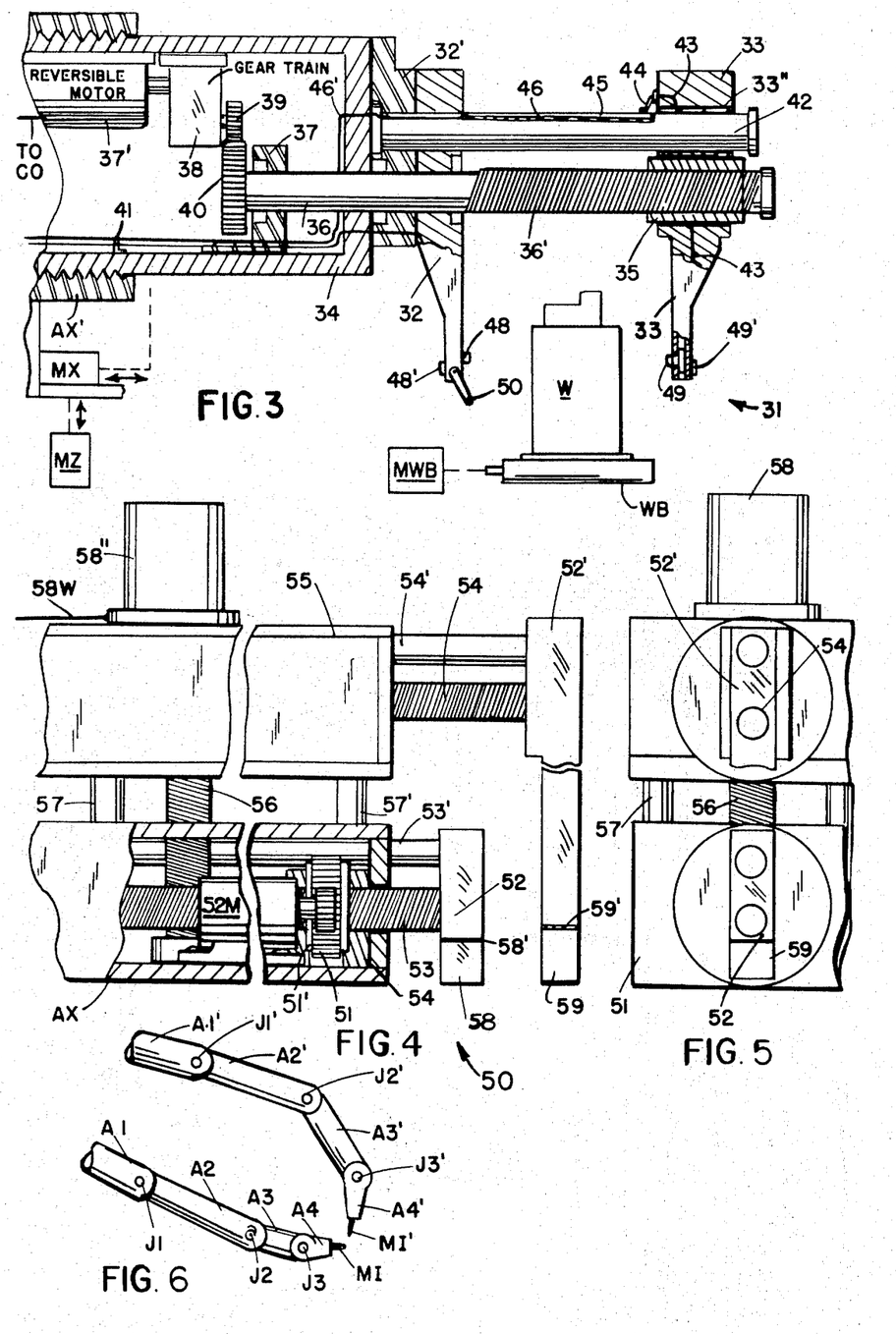
FIG. 3 is a side view with parts broken away for clarity of work measuring jaws applicable to the apparatus of FIG. 1.
FIG. 4 is a side view with parts broken away for clarity of surface sensing jaw elements having grounding or non-contacting surface sensing means.
FIG. 5 is an end view of the apparatus of FIG. 4 with parts broken away for clarity.
FIG. 6 is a side view showing an arrangement of manipulator elements including surface sensing probes applicable to the apparatus of FIG. 2.

FIG. 3 shows details of a measuring head assembly 31 of the type illustrated in FIG. 1 which may be mounted at the end of the arm assemblies illustrated either in FIG. 1 or FIG. 2 or any suitable arrangement of movable components for prepositioning the assembly relative to a workpiece. In its simplest form, the assembly 31 of FIGS. 3 may be mounted stationary above a conveyor or other type of prepositioning means for the work W which is adapted to preposition the work relative to the illustrated separated jaws after which at least one of said jaws is automatically movable to engage a surface of the workpiece.

The assembly 31 comprises a first housing 34 illustrated as a cylindrical member which is removably secured to the end limb Ax' which extends from a further stationary or movable base as illustrated in FIG. 1. The measuring probes comprise a first jaw member 33 which is movable towards and away from a second jaw member 32 which is shown secured by means of a block 32' to the end of housing 34. Movement of jaw member 33 is effected by means of a long, precisioned cut lead screw 36' extending from an integral part of a shaft 36 which is supported in bearing by the end wall of housing 34 and bearing member 37 shown mounted within 34. A large spur gear 40 is secured to the end of 36 and is rotated to rotate 36 and the screw portion thereof by means of a smaller gear 39 secured on a shaft extending from a gear train assembly 38 which is driven by servo motor 37' secured within housing 34. A threaded bushing 35 is secured to member 33 and is operative to cause member 33 to move relative to 32 as 36 is rotated and along the polished surface of a rod 42 which extends through a bushing 33'' extending through the upper portion of member 33 which bushing is slidably engaged against the surface of rod 42. Shown mounted within the hollow end of member 33 and having an actuator arm projecting therefrom is a limit switch which is operatively connected to a control for stopping the operation of motor 37' through a plurality of wires, sliding contactors and the like including a first pair of wires 43 extending through member 33 to a brush contactor 44 which rides on a strip conductor 45 inlaid in a channel in the upper surface of rod 42 and is insulated therefrom which is connected to a further wire pair 41 which extends along the inside of houing 34 and along the arm assembly and is operatively connected to the means for controlling the operation of the drive motor 37'. A second limit switch 48 is mounted within arm 32 and has an actuator jaw member projecting outward therefrom in the direction of the arm 33. The switch 48 is operative to close upon movement of member 32 against or in close proximity to a predetermined surface of the workpiece W and is utilized to energize the control for the motor or servo driving the assembly including housing 34 in the direction which urges jaw member 32 into close proximity or abutment with 31. The switch 48 is connected to said control through the wires included within the bundle 41 which extend directly to 48 through the center of member 32. A movable arm 50 is shown pivotally mounted at the end of 32 and normally projects beyond the plane in which the end of the actuator of switch 48 normally projects. The member 50 may be optionally applied to effect control of the motor moving the assembly including housing 34 so that it slows down when closely proximate to the surface of the work in the manner hereinafter described.

Notation MWB refers to a servo operated means operatively connected to the conveyor or prepositioning table which is preferably controlled by the same programming control means controlling the position of the sensing assemblies described to project WB upward and the work thereon into a position between the jaw members 33 and 32. The servo arrangement may be utilized with the apparatus illustrated in FIG. 1 or a modification thereof in which the jaw members 32 and 33 are secured to a base such as housing 34 which is immovable.

Also illustrated in FIG. 3 are limit switches 48' and 49' having actuator arms protruding outward therefrom in opposite directions and are utilizable for measuring dimensions between surfaces which face each other such as inside diameters and the like.

FIGS. 4 and 5 illustrate a modified dimensional inspection head 50 having a plurality of probes, both of which are movable relative to each other and are utilized to sense the positions of opposite or aligned surfaces of a workpiece without resorting to the operation of limit switches, as taught in FIG. 3 to sense or indicate the position of said surfaces for measuring the distance therebetween. The probes 52 and 52' are movable in two directions relative to each other and may be program controlled to coact with each other in measuring distances relative to the sensing means of each or, to operate separately to measure spacial positions of various surfaces of a workpiece or assembly relative to a base or bench mark established by the mount or base supporting the head assembly 50.

The assembly illustrated in FIGS. 4 and 5 comprises a base Ax which may be rigidly affixed on a support which is immovable or adjustably positionable relative to work to be measured or may be movable on the end of a fixture such as provided in FIGS. 1 or 2 or elsewhere in this application. Movement of base or arm Ax may be effected by automatic control and/or by means of a relay sensing the presence of the work or assembly to be measured which may be substantially conveyed into position as illustrated in FIG. 3.

Sensing head 52 is longitudinally movable outward from the end of base Ax by means of a motor 52M shown mounted within Ax and coupled by means of gears 51 to a geared bushing 51' which is internally threaded and adapted to engage and urge longitudinal movement of a threaded rod 53 which is connected at its outer end to sensing head 52. Notation 53' refers to a shaft secured at one end to 52 and slidably supported by bushings (not shown) with housing Ax to serve as a longitudinal guide for the head 52. Thus operation of reversible motor 52M will effect the movement of head 52 towards and away from the end of base Ax and if the gear ratio is sufficiently high, a complete rotation of said motor may result in a movement of the head 5. in order of thousandths of an inch or less for precise positioning control.

A support 55 for head 52' is illustrated as being movable vertically relative to arm or housing Ax and supporting 52' by means of a drive screw 54 and shaft 54' operable to move probe 52 longitudinally relative to support 55 by means of a motor mounted within support 55 and gear train (not shown) similar to the described drive means for probe 52. Support 55 is movable vertically relativeto Ax'' by means of a drive similar to that provided within arm Ax and including a threaded shaft 56, equivalent to 53 in operation, along which the housing or support 55 is longitudinally driven by means of a threaded bushing similar to 51' which is rotationally supported within 55 and rotated through gears driven by motor 58. Notations 57 and 57' refer to shafts secured to Ax'' which slidably support 55 to guide same in longitudinal travel thereon. The motor, gear train and threaded bushing operatively connected to threaded shaft 54 are assumed to be mounted within support 55 though not shown.

Insulatedly supported on each of the heads 52 and 52' are respective sensors 58 and 59 which may comprise pieces of metal of any suitable shape although illustrated as conforming to the shape of the portion of the heads to which they are secured. The probe ends 58 and 59 are adapted to be driven into contact with the work and to complete an electrical circuit therewith or to sense the presence of the surface of the work by electromagnetic or capacitance means. In other words, though not shown, members 58 and 59 are assumed to be in respective sensing circuits including relay means energizable upon positioning each probe end against or immediately adjacent a surface to be measured to generate a signal for affecting such measurement.

Notations 58' and 59' refer to strips of insulation material disposed between head sensing elements 58 and 59 and their respective bases 52 and 52'.

The heads 58 and 59 may be removable for replacement to provide differently shaped surface sensing devices to conform to different workpieces. Said heads 58 and 59 may also be adjustably positionable relative to their respective mounts if movably mounted thereon and provided with locking screw adjustment means of conventional design to conform to different measurement functions.

FIG. 6 illustrates components of a measurement assembly which is a modification of that illustrated in FIG. 2. Two surface sensing probes MI and MI' are shown respectively mounted on heads A4 and A4' each of which is provided with a respective joint J3 and J3' for pivotal movement relative to second arm members A3 and A3'. The arm members A3 and A3' are further pivotally supported and rotated on joint assemblies and J2 and J2' about further arm members A2 and A2' which are similarly pivotally supported on arm member A1 and A1', the latter being fixedly mounted on a common base. Each of the arm members A2 to A4 is power rotated relative to the member on which it is mounted by means of a respective motor provided within the arm member and the motors are all numerically controlled by signals generated, or example, by a programming means such as a computer operated by means of a magnetic tape. If the base on which A1 and A1' are mounted is rotatable on a further base by means of a servo motor also controlled by signals generated as reproduced from the same tape controlling the other servos, then it is easily seen that the sensing heads MI and MI' may be positioned at substantially any two points or positions in the spacial volume attainable thereby and the positions of said heads will be a function of the number of rotations of each of the motors driving the arm members and the length of each arm members.

Figures 7, 8:
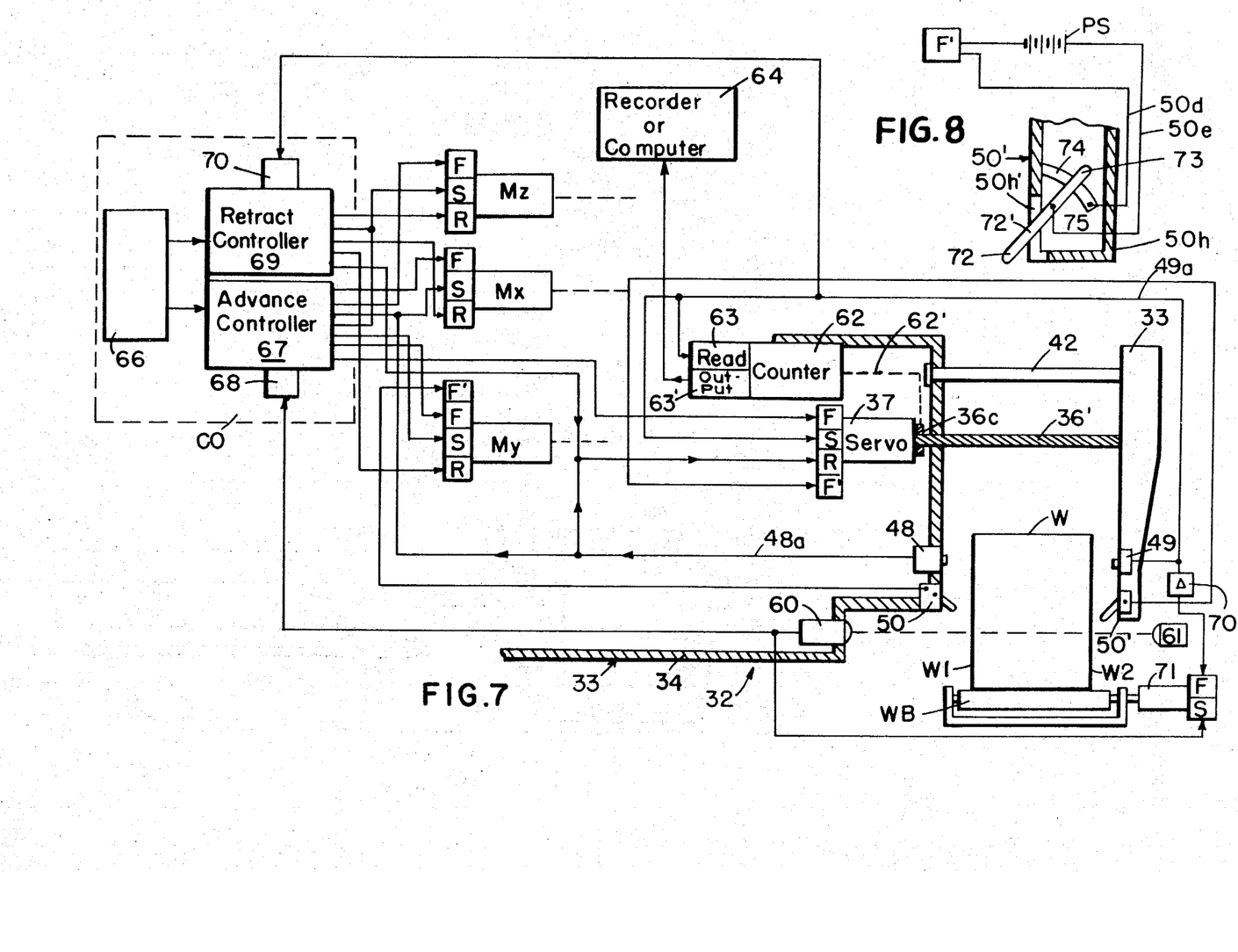
FIG. 7 is a schematic diagram showing means for controlling the apparatus illustrated in FIGS. 1 and 3 and applicable also to the other automatic measuring apparatus of this invention.
FIG. 8 is a partial view with parts broken away for clarity of a portion of the apparatus of FIGS. 3 and 7.

In FIG. 7 is illustrated a block diagram showing means for effecting positioning control of the probe arms 32 and 33 of measurement head 31 illustrated in FIGS. 1 and 3 and it is noted that the control system and components illustrated may also be applicable to the other apparatus such as illustrated in FIGS. 2, 4, 5 and 6 by appropriate modifications thereto. Motor Mx is operative for driving the base on which housing 34 is supported in a longitudinal direction for positioning the probe head 32 relative to a surface to be sensed thereby. Motor My is operative for positioning the entire assembly 31 along a track such as illustrated in FIG. 1 although the use of My may be optional, particularly if a conveyor such as WB is utilized for positioning the work W relative to the fixture. The motor Mz is operative for moving assembly 31 in the vertical direction and again may or may not be utilized depending on the characteristics of the work being measured and how it is prepositioned relative to the measurement head. If the apparatus of FIGS. 4 and 5 is employed, motor Mz may be equivalent to servo 58 and a plurality of servos each operative to move a respective head relative to the work may replace Mx.

A positional computer CO is employed which includes a programming means 66 which may comprise a tape or card reading device having conventional means for generating a programmed sequence of signals such as digital signals which are fed to preset predetermining controllers 67 and 69. The circuitry in controller 67 is operative after being pre-set by command signals transmitted thereto from programming input device 66, and upon energization of a start-cycle input 68 to generate a plurality of control signals on plural outputs thereof which are operative to sequentially control each of the illustrated drive motors by energizing the controls of said motors either for predetermined periods of time or to effect respective predetermined degrees of rotation of each motor by feedback signals generated in response to means for counting said rotations. The start-input 68 for the controller 67 is energized when a sensing device such as a photoelectric cell and relay 60 mounted on the housing 34 on which probe 32 is secured, scans and becomes activated when light from a source 61 secured on the other side of the work W is interrupted by said work. The output of relay 60 is passed as a signal to start control 68 whereafter signals are generated thereby for controlling the various servos including the operation of probe motor 37 to preposition probe head 33 adjacent the surface W2 of work W. Thereafter controller 67 controls the operation of motor Mx whereby probe head 32 is driven towards the other face W1 of the work W until switch 48 becomes activated upon contacting said surface. Upon the actuation of the switch 48, a signal is generated on the output 48a thereof which is transmitted to the stop control S of motor Mx positioning head 32 against face W1 of the work. The signal generated upon cloosure or activation of switch 48 is also passed to the reverse drive input R of motor 37 whereafter the arm member 33 is driven towards face W2 of W until switch 49 closes upon contact therewith and generates a signal on its output 49a which is passed to the stop control S of motor 37 and also to an energizing input 70 of controller 69 which is thereafter operative to control the various servo motors to effect opening of the jaw members or probes 32 and 33 and the withdrawal of the fixture 31 from the work, if necessary, to permit removal of the work and the advancement of a new work member to the vicinity of the measuring apparatus.

An indication of the degree the probe or jaw members 32 and 33 are separated upon predetermined positioning or contact with respective surfaces W1 and W2 of the work, is attained by means of a counter 62 counting rotations or fractions of rotations of the lead screw shaft 36 whenever a cam 36c which is secured to said shaft, actuates the actuator arm of the counter. Counter 62 is provided with a trigger input 63 which is connected for receiving the signal generated by switch 49 when actuated upon movement of member 33 against or adjacent surface W2. Upon receiving such energizing signal, the counter 62 is operative for generating a code signal on an output 63' thereof which is transmitted to a device 64 for recording said code and-/or performing computing functions utilizing said code. The device 64, for example, may include a servo and computing circuitry for operating said servo when the separation of the members 32 and 33 exceeds or falls within a predetermined distance or range of distances for effecting the further handling of the workpiece in a predetermined manner. Notation 71 refers to the motor driving conveyor WB which receives a signal from a delay relay 70 which is energized when switch 49 becomes activated. The operation of 71 to move W away from the probe head 31 is delayed a sufficient period of time to permit the withdrawal controller 59 to command operation of motors Mx and 37 to open the probe members 32 and 33 a sufficient degree so that the work is not engaged thereby and will clear the fixture upon operation of 71. Prepositioning of the work W relative to assembly 31 is affected when the output of photoelectric relay controller 60 is passed to the stop control S of motor 71.

Also illustrated in FIG. 7 are slow-down controls 50 and 50' for motors Mx and 37 which controllers are illustrated in greater detail in FIG. 8. The controller 50' is shown in FIG. 8 and controller 50 is similar in function thereto. Said controller includes a pivotally mounted actuator arm 72 having an end portion 72' projecting substantially beyond the end of the actuator of the limit switch 49 and adapted to first engage the surface of the work immediately adjacent said limit switch. The arm 72 pivots and in doing so causes an electrical wiper section 73 thereof to sweep across a surface resistance element 74 and increase the resistance of a circuit including a controller 76 for the motor 37. The controller 50' may be a speed control such as a rheostat supplying current to the armature of a direct current motor such as motor 37, the speed of which varies proportionally to said current. Hence, the closer probe head 33 gets to the surface W2, the slower motor 37 will operate so that said probe head will slow down substantially prior to being stopped and gently contact or be prepositioned relative to said surface W2. Notation 75 refers to the pivot which arm 72 maintains contact with to complete the circuit through said arm and including resistance element 74, power supply PS and control F' for motor 37.

Notation 50h refers to the wall of the housing or arm 50 and 50h' to the opening therein through which arm 72 projects.

Figure 9:
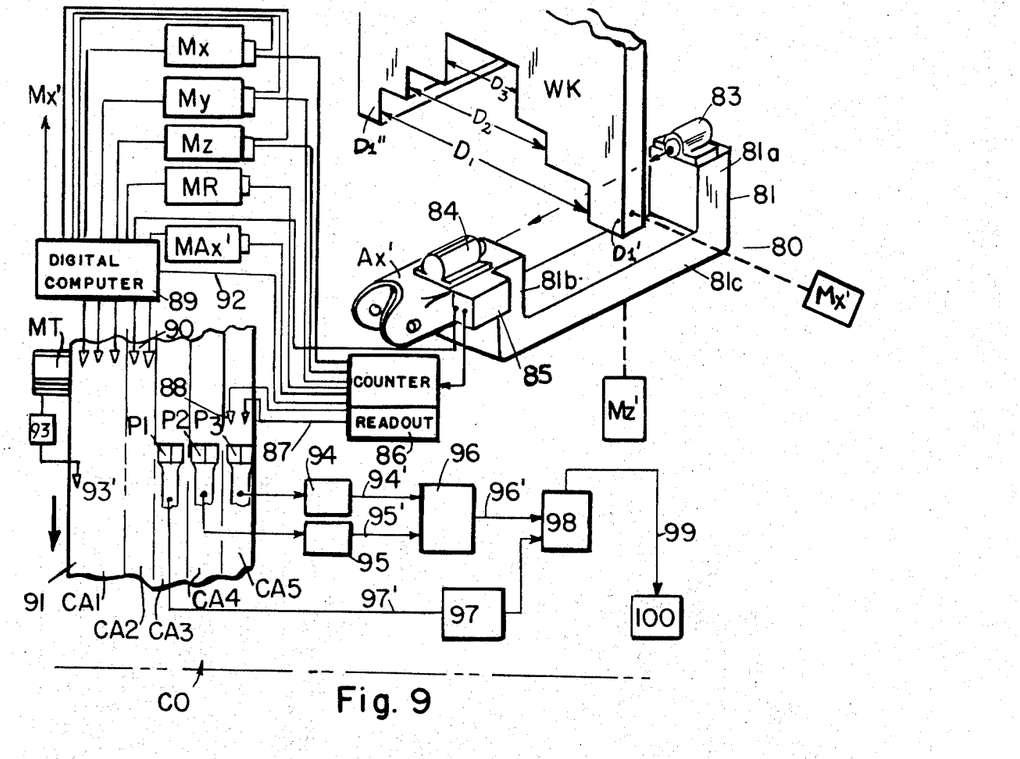
FIG. 9 is a schematic diagram showing control elements operative for effecting the automatic measurement of dimensions by optical scanning and also applicable to the apparatus of the other figures.
Figure 9A:
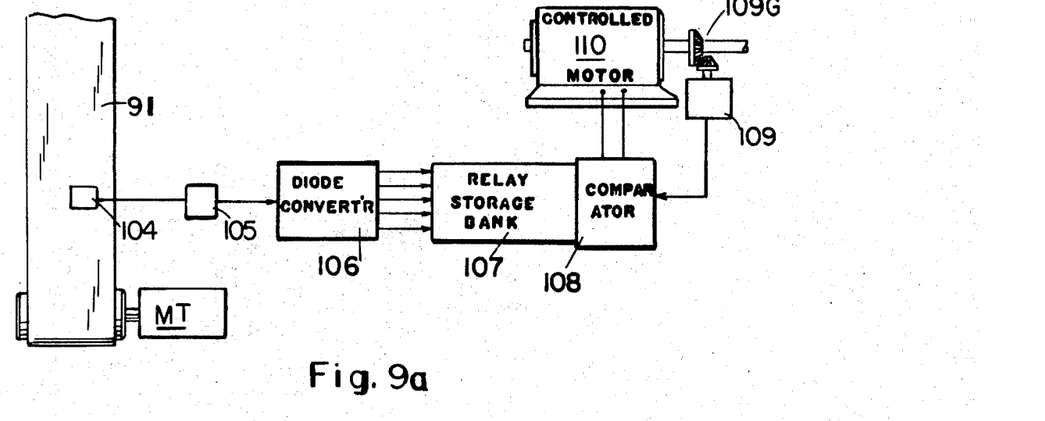
FIG. 9a is a schematic diagram showing a control arrangement for a motor of the type employed in the apparatus illustrated in FIG. 9'.
Figure 10:
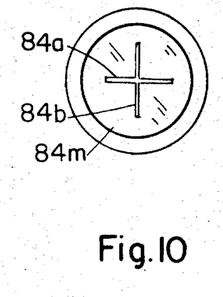
FIG. 10 is an end view of a photoelectric housing applicable to the apparatus of FIG. 9.
Figure 11:
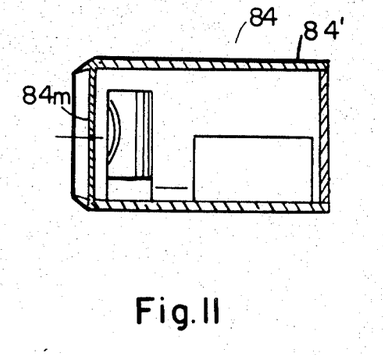
FIG. 11 is a cross-sectional side view of the housing of FIG. 10.
Figure 12:
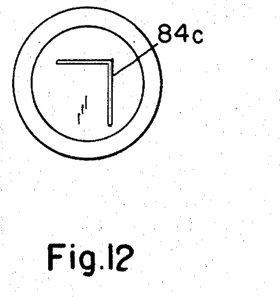
FIG. 12 is an end view of a modified view of the housing illustrated in FIG. 11.

FIGS. 9', 9 and 9a shown details of a system for effecting dimensional measurement of an article or assembly by controlled movement of a scanning head relative to a predetermined surface of said article and the automatic detection of predetermined variations or changes in the optical characteristics of said surface for electrically indicating either distances across predetermined portions of the article such as aligned or opposite surfaces or predetermined variations in dimensions of an article from a standard or known value. A workpiece WK is shown as a sheet or slab-like structure having a plurality of stepped indentations in one edge thereof across which it may be desired to measure distances such as D1, D2, D3, etc. The measuring head assembly 80, in this instance, comprises a U-shaped mount 81 for a light source 83 and the photoelectric detector or cell 84 which are mounted on opposite legs 81a and 81b of the frame 81 and positioned such that a light beam generated by the light source 83, will ordinarily pass to the photoelectric cell in housing 84 and will effect the energization of said cell so as to produce a signal on its output, If the light source is interrupted by, for example, positioning a portion of the work WK between said light source and the photoelectric cell in 84, the signal output of the photoelectric cell will cease. Variations in this arrangement may also include the generation of an electrical signal on the output of the photoelectric cell 84 when no light appears from light source 83 which operation will depend on the phenomenon or article being measured. This may be effected by providing the proper control or switching means within the photoelectric relay housing 85 the output of which is shown connected to a computing device 86 including means for generating a signal or signals on an output 87 thereof which signals may be recorded or otherwise utilized as hereinafter described.

The control computer CO includes means in the form of recordings on a magnetic tape, for generating a plurality of command signals which are operative to preposition the scanning assembly 80 relative to the workpiece WK and/or the workpiece relative to said scanning assembly. The scanning head 80 may comprise any suitable surface detection and transducing means including, in addition to the arrangement provided in FIG. 9, surface contacting means such as illustrated in FIGS. 3 to 6 and means of the type illustrated in FIG. 1 and 2 for prepositioning and conveying said head assembly relative to a workpiece or assembly to be measured thereby. The U-shaped frame or mount for 81 is shown secured to an arm Ax' which may comprise the terminal limb or arm of a plurality of such arms such as illustrated in FIGS. 1, 2 or 6 and including adjustably movable components for moving said scanning or surface detection means mounted thereon by the controlled operation of a plurality of servo motors referred to by the notations Mx, My, Mz, MR, MAx', etc. These motors are shown having their control inputs operatively connected to a positional control computing device 89 which is operatively connected to a plurality of reproduction heads 90 positioned for reproducing command recordings on respective channels C of a magnetic recording tape 91 for predetermining the path of movement of the measurement head assembly 80 and/or the work WK.

Signals recorded on one of the channels of a first band-like command recording area CA1 of the recording member 91, are reproduced therefrom in synchronization with the reproduction of the command recordings which position the measurement head 80 and are passed to a circuit 92 connected for conditioning the counting device in the distance computing device 86 to become active for receiving a signal generated by the photoelectric relay 85, so that, during prepositioning said relay before the photoelectric cell in housing is aligned with a portion of the work WK and receiving light from light source 83, the counter in 86 will not become activated. In other words, signals recorded on the command recording portion CA1 of 91 are utilized not only to preposition the measuring assembly 80 and the work but also to activate and deactivate the counting or measuring circuits in 86 so as to be active only during that portion of the measurement cycle during which scanning is effective to perform dimensional measurement. In measuring the dimension D1, for example, a signal reproduced from the tape and generated on control input 92 to 86 is generated to activate the measuring circuit or counter therein only during the interval the photoelectric relay is aligned with and scanning a path defined by limiting points illustrated at D1' and D1''. The photoelectric relay in housing 84 becomes active to gate or energize the counter in 86 only after its scanning axis has passed the edge of the work WK inward of point D1' and generates a signal for gating said counter until said scanner is conveyed past the edge inward of D1''. The resulting numerical value of the counter in 86 is automatically converted to a proportional binary or code signal generated on an output 87 connected to a recording head or bank of heads 88 which are operatively coupled to the recording member 91 for recording on a channel or channels defined by bank recording area CA5 of the same tape from which the positional command recordings were reproduced. The energization or readout of the counter in computing device 86 may also be effected by reproduction of a signal from the command recording area 91 which is generated on the control line 92 and passed to 86.

By utilizing the recording and command control arrangement of FIG. 9, signals are automatically provided on the signal recording member 91 which are indicative of the dimensions measured and are recorded in predetermined positions relative to the positional command recordings. In other words, the positions of the newly recorded dimensional signal on the recording member are indications of which dimensions were so measured. Since the apparatus provides means for predetermining the location of dimensional indicating signals, other signals may be pre-recorded on other channels or bank recording areas of the recording member 91 such as CA3 and CA4 which will be indicative of standard or predetermined dimensions such as required of the measured dimension for it to conform to a predetermined value or to fall within a predetermined tolerance range. Before describing the function and operation of comparator means illustrated in FIG. 9 for comparing actual measurements with predetermined standards, reference is made to FIG. 9' which shows further details of the computing device 86. Said device may comprise a pulse counter 86c having an input 86c' which is the output of a pulse generator 86b, which is activated to generate a train of pulses of the same time duration and repetition frequency whenever an input 86b' thereof is energized by a signal from the photoelectric relay 85 provided that a normally open switch 86a in the output of 85 is closed by a signal generated on line 92' and reproduced from a channel of recording member 91 in predetermined time relation to the other positional command signals such as during the interval the scanning axis of the photoelectric cell PH in housing 84 passes between points D1' and D1'' along the surface of the work which includes the dimension to be measured. In other words, pulse generator 86b is activated to generate a train of pulses on its output 86c' only during that interval the actual dimension to be measured is being scanned and the number of pulses gated to the input of counter 86c is proportional to the actual dimension so measured.

After receipt of the chain of pulses generated in scanning the dimension in question, the counting device 86c may be provided with automatic means for generating a code on its output 87 which may be passed directly to the recording heads 88 and recorded on the recording area CA5. Illustrated in FIG. 9' is a control 86d which is energized by a signal on the input 92 generated in predetermined time relation to the movement of the inspection head conveying apparatus as reproduced from a channel of the command signal recording area CA2. When control input 86d is so energized, it is operative to effect the generation of said dimension indicating pulse train or binary code on the output 87 of 86c which may be directly recorded on a single channel or, as illustrated in FIG. 9', may be passed to a shift register 86e where it is converted to parallel code generated on a plurality of outputs 88' which extend to a bank 88 of recording heads for recording on respective channels of the area CA5 of the recording member 91.

It is noted that other forms of command signal recording may also be employed to effect the program control hereinabove described and to generate said signals which are indicative of standard or desired dimensions. Reading arrangements employing recordings on punched cards, punched tape or other forms of recording may replace or supplement the described magnetic recording arrangements.

Although control of the position and path of travel of the measuring head or probe assembly 80 relative to the work WK may be effected by the continuous movement of the recording member 91 past reproduction heads 90 for reproduction of the positional command recordings, in certain modes of automatic measurement it may be advantageous to stop the travel of the tape during periods automatic computations, recordings, or the like are being made. Accordingly, signals may be recorded on bank recording area CA1 which are reproduced by a pick-up head 93' and passed to a controller 93 controlling operation of the motor MT driving the tape, to stop movement of said tape and later resume its movement past said reproduction heads. Motor MT may be automatically restarted by a time delay relay control or by a signal generated on an output such as 87 of code generator counter 86.

It is briefly noted that the counter in computing mechanism in 86 may also include means for visually indicating the value of the dimension being automatically measured for local immediate monitoring.

Referring now to recording areas defined by notations CA3, CA4 and CA5, it is noted that the reproduction heads or bank of heads referred to by the notations P3, P2 and P1 are respectively positioned for reproducing from said respective reproduction areas of said recording tape. As stated, recording area CA5 contains signals indicative of the actual dimensions measured as recorded through recording head bank 88. Prerecorded or predetermined lengths of the recording area CA4 are a plurality of signals or groups of signals which are indicative of standard or desired measurements with each group being provided jin such a position that it may be reproduced simultaneously or in predetermined time relation to the reproduction of a signal or group of signals recorded on channel CA5 relating to the dimension measured by the scanning apparatus to be compared with a predetermined value. In other words, since the recordings on channel CA4 are prepositioned relative to the positional command recordings on channel or area CA1 and furthermore, since the recordings of actual scanning on CA5 are prepositioned relative to said same positional command recordings, then the standard recordings will be prepositioned relative to the actual recordings on CA5. Each associated group of recordings is reproduced and amplified in respective amplifiers 94 and 95 and passed on respective output circuits 94' and 95' to a comparator device 96 where the signals are compared and the difference or variations therein are computed. A visual or signal indication of the difference of the measured dimension from the standard dimension is provided by a second comparator 98 which is shown as having a further input 97' from a further reproduction transducing means P1 which is operatively coupled to channel CA3 on which may be recorded nominal or standard groups of signals each of which is equivalent in numerical value to an acceptable range of variations of the measured dimension from the standard dimension and is operative, upon being reproduced and transmitted on the output 97' to the comparator device 98 to determine if the measured dimension falls outside of or within the predetermined tolerance range. Accordingly, a second comparator 98 is provided to accept both the difference signal generated by comparator 96 and that reproduced from channel CA3 and is adapted to generate a signal or signals on its output 99 which are indicative as to whether or not the image measured falls within or beyond the predetermined tolerance range which signals may be recorded in a further recording device 100, which may be used merely for record-keeping purposes, as a means for providing dimensional codes or code indications or variations of dimensions from tolerance for immediate or later computer analysis. The device 100 may also contain an alarm means for indicating by visual means or sound to an operator when a dimension so measured falls outside of the tolerance range as determined by recordings on channels C3 and/or C4.

A complete description of the control apparatus for controlling the various conveyor components to travel predetermined degrees and paths to cause the measuring probe or head to be prepositioned relative to a workpiece and to thereafter move in a predetermined path in scanning or sensing various portions or surfaces of the workpiece is brief since it is not claimed specifically herein. Various automatic control systems for predetermining the path of movement of machine tools are known in the art and reference is made to U.S. Pat. Nos. 2475245 and 2710934.

FIG. 9a illustrates apparatus for controlling a single servo motor by means of signals reproduced from a magnetic recording tape 91, which apparatus when multiplied in number to provide similar controls for the various servo motors illustrated in FIG. 9, may be utilized as a suitable mode of control for the entire measuring head prepositioning apparatus.

The apparatus illustrated in FIG. 9a employs recorded digital data which is transformed to effect the control of a continuous shaft rotation by reproducing impulses from a respective channel or channels of the recording member 91 which are converted to a binary code by a diode converter 106 which code is used to set up a relay storage bank 107 containing precision resistors. The contacts of the storage unit relays set up the resistance bank in 107 so that the value set-up is proportional to the digital information recorded on the tape 91. The relay storage introduces a resistance proportion to the numerical value of the signals reproduced from the tape into a self-balancing bridge which forms part of a comparator device 108. A feed-back signal generated during the operation of the servo motor being controlled, such as by means of a response potentiometer 109 which is coupled to the shaft of the control motor, provides an error signal at the output of the comparator 108 which is used to control the operation of said motor until the bridge is balanced or a null condition exists whereupon the motor will stop with the component or assembly driven thereby being at a predetermined spacial position as commanded by the code on the tape. Other signals reproduced from the magnetic tape 91 are positionally provided to operate others of the motors positioning the fixture or measuring head in a predetermined sequence with each servo controlled also thereby so that said measuring head or probe will travel a predetermined path or contour relative to the workpiece.

Of course, other path determining means such as contour following means may also be utilized to effect such path predetermining controls.

While a photoelectric cell and light source 83 are provided in FIG. 9 for scanning and indicating the position of various edges of the workpiece to effect automatic measurement thereof, it is noted that the control apparatus as well as the recording, reproduction and comparator means of FIG. 9, 9' and 9a may be applied for controlling and effecting automatic measurement with the probe-contact or surface sensing apparatus provided elsewhere herein such as illustrated in FIGS. 1 to 8.

It is further noted that the train of pulses utilized for measuring the degree of movement of the probe or measurement head between or across predetermined surfaces may be effected by actuation of a limit switch by means of the rotation of the particular motor utilized in moving said probe or head between said surfaces.

Other forms of radiation such as an X-ray generator, source of nuclear energy, infra-red generating means and selective detection means may also be utilized and may replace or supplement the photoelectric detection means and light source provided in FIG. 9.

It is also noted that the limit switch surface sensing means provided herein may also comprise a flidically operated sensor such as a fluid amplifier operative to detect a surface when air ejected thereby or from a nearby nozzle is interrupted by the work or is varied sufficiently in its flow to permit the detector to generate a fluidic detection pulse which may be utilized to effect measurement and control functions as described by activating suitable fluidic control devices which are the fluid equivalents of those herein described.

In another form of the invention, the image area, workpiece or component being measured may be supported on a mount or conveyor therefore and predeterminedly positioned and moved past scanning means such as the type described to effect such automatic measurement or indication that the dimension being measured is within or out of a predetermined tolerance range. Any suitable conveyor or manipulator for the work which will predeterminedly position and move the work past the optical gauging light source and photosensor while said devices are held stationary may be employed and, like the movable mount for the light source and scanner heretofore described, may be numerically or otherwise automatically controlled to move the workpiece or image being scanned through a predetermined path or paths.

The described scanning system employing an aligned and spaced-apart light source and photoelectric cell may be replaced by any suitable photosensing system including one containing an electron gun with a deflection controlled electron beam, an X-ray generating gun for measuring internal dimensions, or a light source mounted at the side of or in direct alignment with a photosensor adapted to receive light from the source reflected from the surface being scanned and to indicate variations in said surface or when the scanner has scanned beyond an edge thereof by failure to receive reflected light therefrom.

In still other forms of the invention, the apparatus of FIGS. 9, 9' and 9a or modifications thereof may be utilized for scanning and measuring or digitizing photographed or optical images of various objects or other physical phenomena. The workpiece WK may be replaced by photographic film or an imaging screen on which the image or a shadow of the object to be scanned has been projected or otherwise provided. The photosensor 84 may comprise a flying spot scanner or conventional television scanning camera operative to generate an output signal which may be digitized as described. Or, said output signal may be analyzed and digitized by a computing device as provided in my copending U.S. Pat. application Ser. No. 267,377 and U.S. Pat. No. 3,081,379. If a filmstrip is utilized containing a tandem array of frames to be individually beamscanned, the beam generating apparatus and filmstrip may be controlled in operation as provided in my copending applications Ser. Nos. 219,609 and 123,327.

I claim:

1. An automatic inspection apparatus comprising in combination:
   first and second transducing means,
   a base,
   first and second support means supported by said base for respectively supporting said first and second transducing means,
   means for guiding said second support means and said second transducing means in a predetermined path adjacent said base,
   means for supporting work to be measured between said first and said second transducing means and
   means for effecting relative movement between said work and said first support means to position said first transducing means in sensing relationship with a first surface of said work,
   means for driving said second support means to locate said second transducing means away from a second surface of said work between which second surface and said first work surface an indication of distance is desired,
   said means for driving said second support means being operable to move said second transducing means towards said second surface of said work after the work is disposed between said first and second transducing means to bring said second transducing means into sensing relation with said second surface of said work,
   means for generating a control signal when said second transducing means senses said second surface of said work towards which it is driven,
   first control means operative to receive said control signal and responsive thereto to control said drive means for said second support means to stop the movement of said second transducing means towards said second surface, and thereby prevent damage to said second support means and the work, and
   indicating means for indicating the distance said first and second transducing means are separated so as to provide an indication of the distance between said first and second transducing means when each senses a respective surface of the work.

2. An apparatus in accordance with claim 1 including means for guiding and driving said first support means in a predetermined path adjacent work predeterminately disposed with respect to said base,
   control means for said second driving means,
   means for generating a second control signal when said first transducing means senses said first surface of said work towards which it is driven, and applying said second control signal to said latter control means to stop said second means driving said first support means when said first transducing means is in sensing relationship with said first surface.

3. An inspection apparatus in accordance with claim 1 wherein said means for effecting relative movement between said work and said first support means comprises means for driving and guiding said first support means with respect to said base and means for stopping said driving means for said first support means when said first transducing means senses the surface of the work towards which it is driven.

4. An inspection apparatus in accordance with claim 3 including means for generating a control signal when said first transducing means senses the surface of the work towards which it is driven and means for applying said latter control signal to effect stoppage of said means driving said first support means.

5. An inspection apparatus in accordance with claim 4 wherein said first and second support means comprise respective manipulator arm assemblies each of which is independently operable to effect three-axis movement of said first and second transducing means.

6. An automatic inspection apparatus comprising in combination:
a support,
a measuring head supported by said support,
a first surface contacing member supported by said measuring head,
a second surface contacting member movably supported to said measuring head to permit travel thereof towards and away from said first surface contacting member for measuring work disposed between said first and second surface contacting members,
transducing means associated with said second surface contacting member and operable to sense a surface adjacent to said second surface contacting member,
reversible motor means for driving said second surface contacting member towards and away from said first surface contacting member,
first and second control means for respectively causing said motor means to drive said second surface contacting member towards and away from said first surface contacting member,
means for supporting a unit of work to be measured between said first and second surface contacting members,
means for relatively moving said measuring head and said work to bring a selected surface of said work into contact with said first surface contacting member,
means for activating said first control means for said motor means when work is disposed between said first and second surface contacting members to cause said second member to be driven towards said first member until said transducing means senses a surface of said work opposite to the surface contacting said first member,
stop control means for stopping the operation of said motor means driving said second surface contacting member towards said first member,
means for generating a control signal when said transducing means senses the surface of said work towards which said second surface contacting member is driven and means for applying said control signal to said stop control means to stop the driving motion of said second surface contacting member towards said work,
means for indicating the distance said first and second members are apart when said control signal is generated, and
means for indicating the distance said first and second members are apart when said control signal is generated.

7. An automatic inspection apparatus in accordance with claim 6 wherein said measuring head is movably supported on said support, reversible motor means for driving said measuring head in a fixed path in a first direction on said support to position said measuring head in alignment with a unit of work to be measured thereby, and means for effecting relative movement between said measuring head and work aligned therewith in a second direction to cause said first and second members to be positioned in alignment with and apart from opposite surfaces of said work, and automatic control means for controlling the operation of said motor means driving said measuring head, said means effecting relative movement between said work and said measuring head and said motor means driving said second surface contacting member, to first cause said measuring head and work to become aligned with each other, then to dispose work to be measured between said first and second surface contacting members, then to move said measuring head to cause said first surface contacting member to engage one surface of said work, then to cause said second surface contacting member to be driven and sense the other surface of said work to effect a measurement operation.

8. An apparatus in accordance with claim 6 wherein said second surface contacting member is operable to contact the surface of the work towards which it is driven and said automatic control means is operable to effect the reverse driving operation of said motor driving said second surface contacting member to cause said second surface contacting member to be driven away from the surface of the work after sensing said surface.

9. An apparatus in accordance with claim 6 including a transducer supported by said first surface contacting member and operable to sense the surface towards which said first surface contacting member is driven and to generate a control signal, means for applying said latter control signal to the means for relatively moving said measuring head and said work to stop said relative movement, and means for applying said latter control signal for reversibly operating said motor means to drive said second surface contacting member away from the surface it has just sensed.

10. An apparatus in accordance with claim 7 wherein said means for effecting relative movement between said measuring head and said work in said second direction comprises a reversible motor means for driving said measuring head in said second direction while said work is disposed fixed with respect to said support.

11. An apparatus in accordance with claim 6 wherein said means for indicating the distance said first surface contacting member and said second surface contacting member are apart comprises a counter and means for generating pulse signals with incremental degrees of movement of said second surface contacting member towards said first surface contacting member, means for applying said pulse signals to operate said counting means whereby said counting means operates to indicate said distance.

* * * * *